United States Patent [19]
Carnes

[11] 3,792,561
[45] Feb. 19, 1974

[54] AUTOMATIC PACKAGING METHOD

[75] Inventor: Roy W. Carnes, Richmond, Va.

[73] Assignee: AMF Incorporated, White Plains, N.Y.

[22] Filed: Nov. 19, 1971

[21] Appl. No.: 200,382

[52] U.S. Cl. .................................. 53/28, 53/182
[51] Int. Cl. ............................................ B65b 9/02
[58] Field of Search ............... 53/74, 28, 180, 182

[56] References Cited
UNITED STATES PATENTS

| | | | |
|---|---|---|---|
| 3,355,857 | 12/1967 | Tobey | 53/74 X |
| 3,490,194 | 1/1970 | Monaghan | 53/74 X |
| 3,508,378 | 4/1970 | Fehr et al. | 53/180 |
| 3,158,973 | 12/1964 | Monaghan | 53/182 X |
| 3,191,356 | 6/1965 | Zelnick et al. | 53/182 |

Primary Examiner—Robert L. Spruill
Attorney, Agent, or Firm—George W. Price

[57] ABSTRACT

A method of packaging articles, which comprises the steps of advancing a group of articles through a work station, rotating feed rollers to withdraw sheets of packaging material from two supplies thereof, feeding the packaging material through the work station above and below the articles as they are being advanced therethrough, sealing the two sheets of packaging material to each other to form the front of a package, pushing the group of articles against the front of the package, advancing the articles from the work area, controlling the amount of rotation of the packaging material feed rollers to provide measured lengths of the two packaging material sheets, and sealing the two sheets of packaging material to each other to form the rear of the package.

6 Claims, 5 Drawing Figures

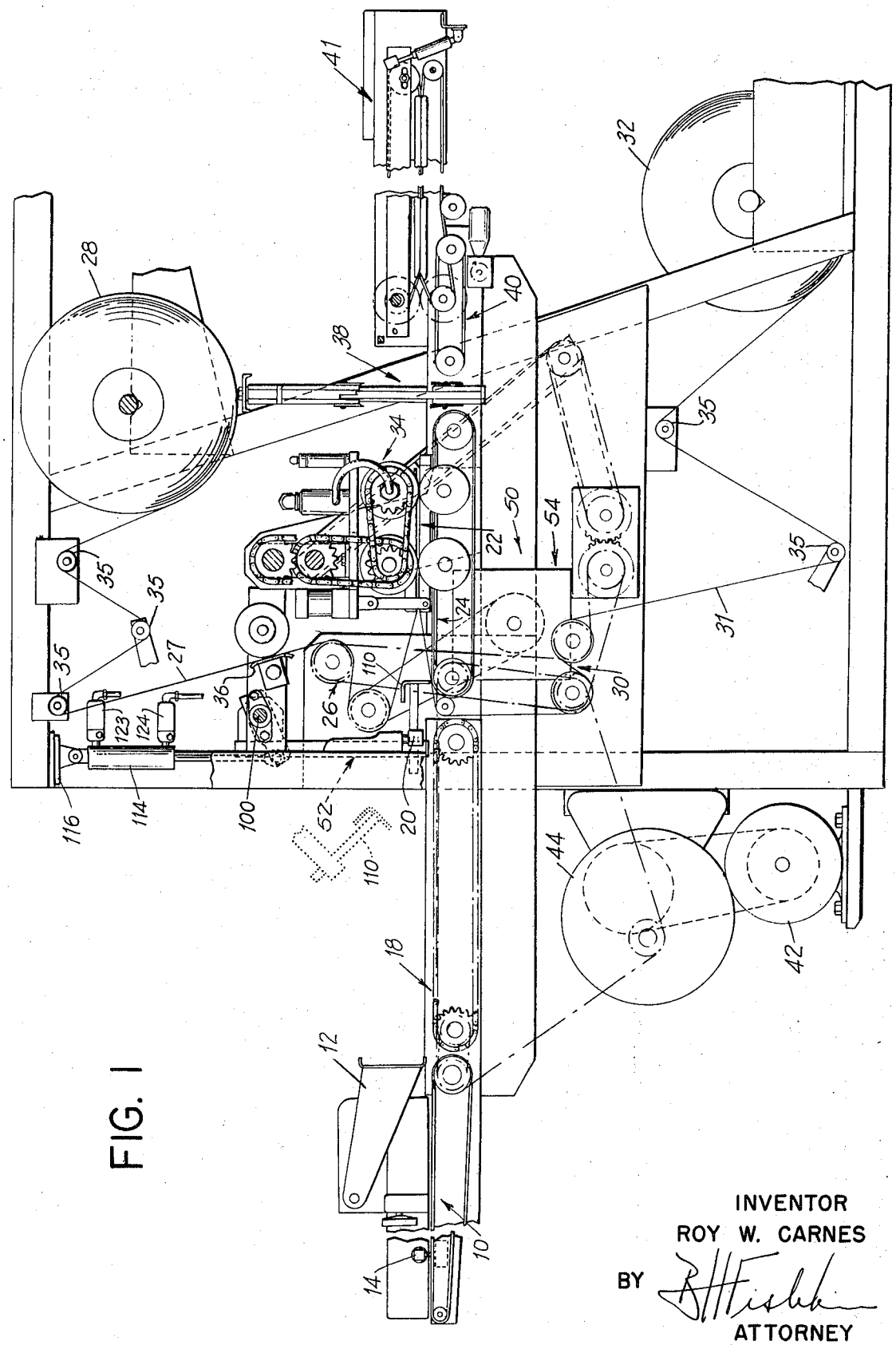

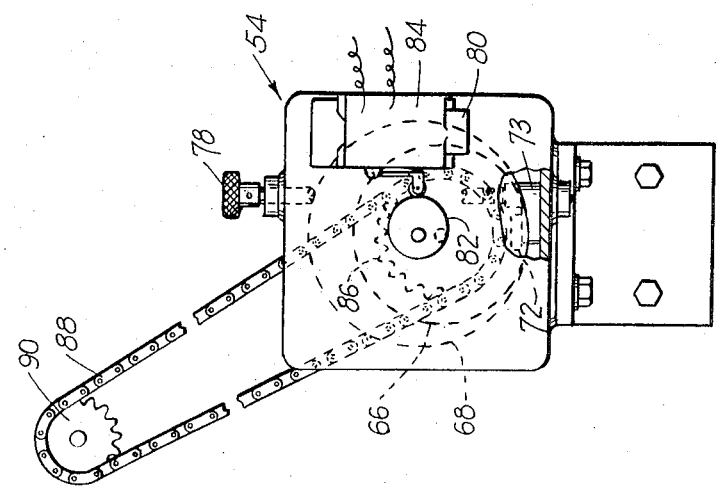
FIG. 3
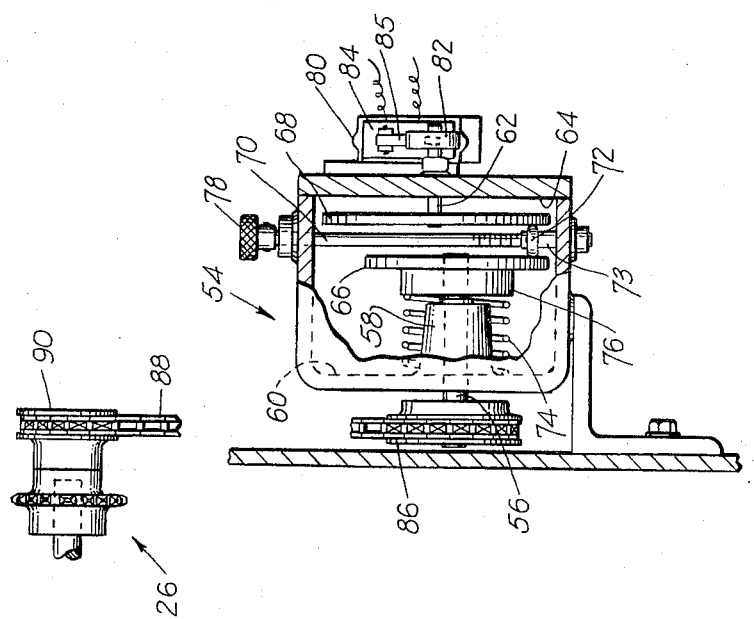
FIG. 2
INVENTOR
ROY W. CARNES
ATTORNEY

INVENTOR.
ROY W. CARNES

BY
ATTORNEY

AUTOMATIC PACKAGING METHOD

BACKGROUND

This invention relates to the manufacture of packages and more particularly to the fabrication of plastic packages closely surrounding the articles being packaged.

The use of plastics, such as polyethylene, in thin films as a packaging material for edible products and the like has attained wide spread consumer acceptance and popularity in the last few years. In response to this popularity, a number of sophisticated packaging machines have been designed utilizing such plastic films as packaging material.

In a common cycle of operation, such a machine advances the article to be packaged through a work station and a film of thermoplastic packaging material drawn from a supply is supplied to the work station above and below the article. The packaging is effected by heat sealing the two thermoplastic films together opposite the four sides of the article.

One of the problems attendant this type of operation is the "tightness" of the package produced thereby, that is, the closeness of the product or group of products in the package to the borders thereof. A "loose" package may be unwieldy and unsightly and a machine that produces such a package is less effective than a machine that produces a tight package.

SUMMARY

It is, therefore, an object of this invention to provide improved means for forming packages made from sheets of packaging material.

It is a yet further object of this invention to provide a method of joining sheet material around a package such that the material closely surrounds the articles being packaged.

It is a further object of this invention to provide in a packaging apparatus a packaging material metering device operable to provide a precise length of packaging material for each package being formed by the apparatus.

It is a still further object of the invention to provide a method of pushing articles in a partially formed package against one of the borders thereof to provide a package where the articles there are in close proximity to the sides of the package.

In accordance with these and other objects, a method according to the invention may comprise the steps of advancing a group of articles through a work station, advancing a predetermined amount of packaging material through the work station above and below the articles, sealing the front of the package at the end of the work area, and pushing the group of articles in the work areas against the front end of the package.

DESCRIPTION OF THE DRAWINGS

FIG. 1 is a side elevation view of a packaging apparatus incorporating a preferred embodiment of the invention.

FIG. 2 is a front view, partially broken away, of packaging material metering apparatus according to the invention.

FIG. 3 is a side view of the apparatus shown in FIG. 2.

DESCRIPTION OF THE PREFERRED EMBODIMENT

Figure 5:
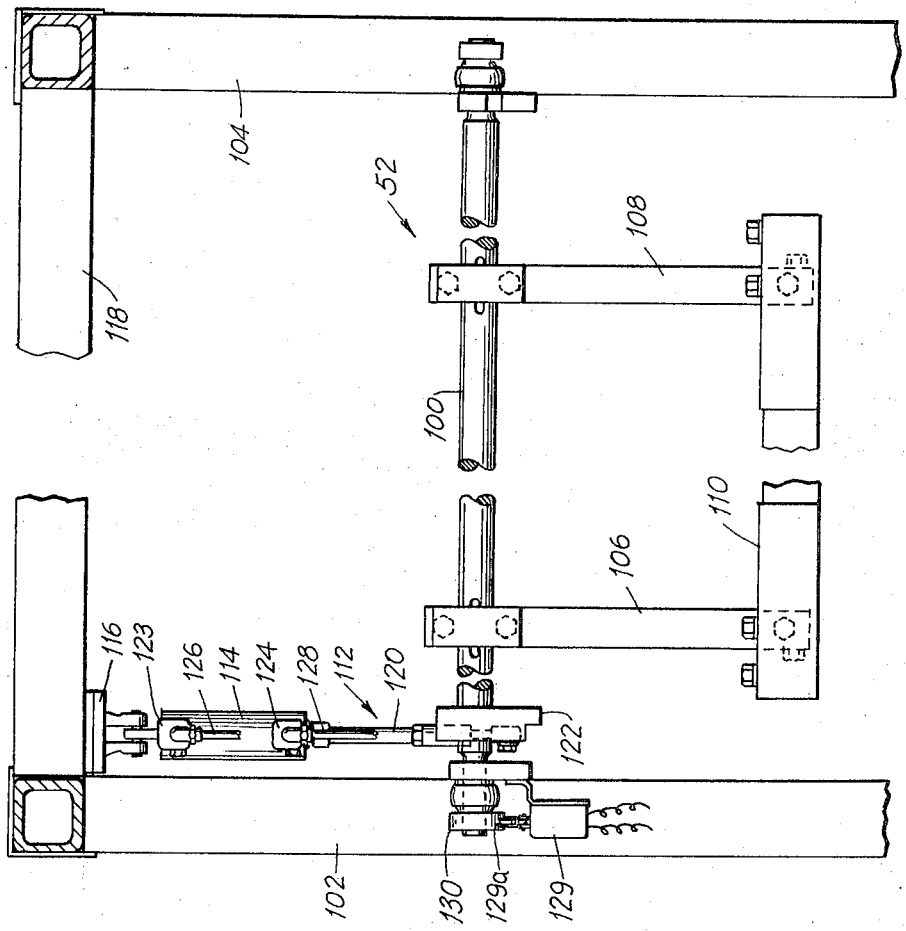
FIG. 5 is a rear view of the assembly shown in FIG. 4.

The subject invention is described here in conjunction with packaging apparatus schematically disclosed in the Assignee's U.S. Pat. No. 3,503,175 entitled "Bulk Packer" and more specifically in the Assignee's co-pending application Ser. No. 879,768, filed Nov. 25, 1969 and now U.S. Pat. No. 3,625,802.

Summarizing briefly, with reference to FIG. 1 of the drawings, in this type of apparatus articles to be packaged are advanced down a first conveyor 10 (the reference numerals in this application do not necessarily correspond to those of the patent, nor Assignee's co-pending application) to a gate mechanism 12 which opens upon the sensing of predetermined article or group of articles by a sensing device 14. When the gate opens, the articles are fed to a second conveyor 18 which conveys the articles past a second sensing device 20 to a work area 22 that includes a work area conveyor means 24.

A pair of plastic film feed rollers 26 are mounted above work area 22 and are operable to withdraw a sheet or web of plastic film 27 from a supply reel 28 for advancing to the work area 22 above an article or group of articles to be packaged. In a like manner, a pair of feed rollers 30 are mounted below work area 22 and are operable to withdraw a sheet of plastic film 31 from a supply reel 32 for advancing to the work area between an article or group of articles to be packaged and the conveyor means 24.

The two plastic films are brought together at the sides thereof and are fed through a pair of side sealing combinations 34 mounted one to each side of the apparatus. The distance between the two side sealing combinations and the operative portions of work area conveyor means 24 are adjustable to tailor the width of the package to the article or articles being packaged as set forth in detail in the aforementioned co-pending application.

A plurality of idler rollers 35 are provided in conjunction with the feed rollers and supply reels to allow for back-up in case of jamming. A perforating wheel and anvil 36 are mounted to the apparatus frame to place a longitudinal perforation in the top film 27 for purposes set forth in detail in the aforementioned U.S. Pat. No. 3,503,175.

An end sealing and severing subcombination 38 is mounted at the rear of conveyor 24 and is actuated after the work area conveyor 24 and the side sealing subcombinations convey a group of articles and lengths of packaging material through the work station thereto. This forms the front of the package. After the work area conveyor and the paper feed mechanism are actuated again by the sensing device 20 to drive another group of articles and lengths of packaging material through the work area, the actuation of the end sealing and severing combination 38 forms the rear of the package of which the front and a portion of the sides were formed on the previous cycle, as well as the front of the next package, all as described in detail in the aforementioned U.S. Pat. No. 3,503,175.

An exit conveyor 40 transports the completed packages to a package loading combination 41, which then transports the completed packages to a transfer point, whereat it is removed from the apparatus for further handling.

The conveyors 10, 18, 24 and 40 are driven continuously by a motor 42 through a drive train 44, which is disclosed in detail in the aforesaid copending application, with the packaging operation being controlled by a clutch and brake mechanism (not shown) operatively connected to the sensing devices 14 and 20, the control for the plastic film feed rollers 26 and 30 set forth hereinbelow, and the end sealer 38. The cycle is an intermittent one, with the longitudinal drive of the articles and film through the work area being inactivated by the clutch and brake during the operation of subcombination 38 as it forms the front and rear of each package and being reactivated as a group of articles are sensed by sensing device 20. Sensing device 14 and gate mechanism 12 assure the proper spacing of articles being advanced along the conveyors 10 and 18, all as described in detail in the aforementioned U.S. Pat. No. 3,503,175.

Figure 4:
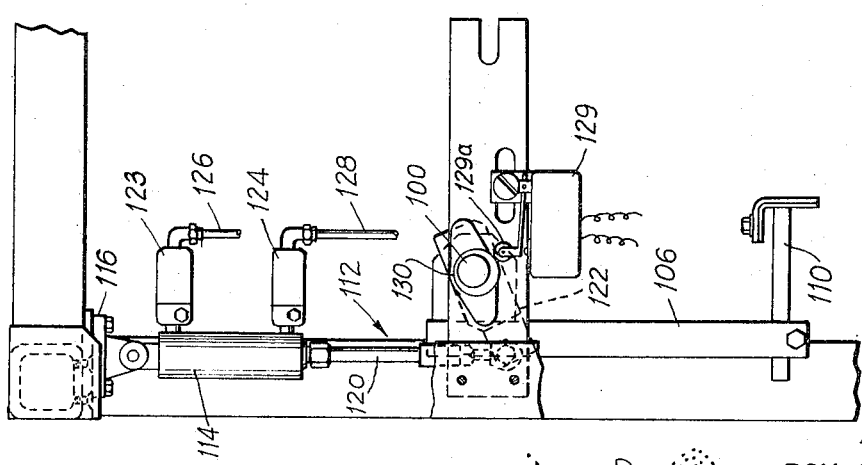
FIG. 4 is a side view of the packaging apparatus showing an article grouping assembly according to the invention.

Referring now to FIGS. 2–5 as well as FIG. 1, apparatus for controlling package lengths and providing "tight" packages lengthwise is mounted adjacent to the work area and comprises a controlled and controllable paper feed mechanism 50 and an article grouping mechanism 52.

The paper feed mechanism 50 is mounted in a housing 54 and includes a first shaft 56 rotatably mounted in a sleeve 58 formed on one side wall 60 of the housing 54 and a second shaft 62, parallel to, but offset from shaft 56, mounted in the side wall 64 of housing 54 opposite to side wall 60. Both shafts extend only partially into the housing seen in FIG. 2. A pair of circular bearing plates, designated 66 and 68 respectively, are mounted at the end of shaft 56 and 62 respectively and are disposed in parallel spaced relationship to each other.

A rod 70 is mounted in the housing 54 between the top and bottom of housing 54 between bearing plates 66 and 68 and is disposed parallel thereto. A bearing disk 72 is rotatably mounted on a sleeve 73 threadedly mounted on rod 70. Shaft 62 is sized and positioned such that bearing plate 68 is in engagement with disk 72. Bearing plate 66 is urged into engagement with bearing disk 72 by a spring 74 mounted around sleeve 58 and between side wall 60 of the housing and a thrust bearing 76 connected to the bearing plate 66. The location of the disk 72 on rod 70 can be adjusted vertically by turning a knob 78. This causes sleeve 73 to travel up or down rod 70, depending on the direction knob 78 is turned, due to the threaded connection therebetween.

A small housing 80 is mounted on the side wall 64 of housing 54. Shaft 62 extends out of housing 54 and a cam 82 is mounted on the portion of shaft 62 extending from the housing 54. A microswitch 84 is mounted in housing 80 in spaced relationship with cam 82 and an actuating member 85 is mounted on the housing in spaced relationship with cam 82 and microswitch. With this arrangement cam 82 causes actuating member 85 to actuate microswitch 84 at the same point in every revolution of shaft 62.

A sprocket 86 is mounted on shaft 56 and a chain 88 connects sprocket 86 with a like sprocket 90 coupled to the plastic film rollers 26.

In operation, upon the sensing of the leading edge of a group of articles at the entrance to the work area 22 by sensing device 20, the paper feed rollers 26 and 30 are actuated to feed film through the work area above and below the articles. Rotation of the paper feed rollers continues until shaft 62, which is coupled to the paper feed rollers through sprockets 86 and 90 and chain 88, rotates one revolution, at which time actuation of microswitch 84 shuts off the paper feed and actuates the end sealing and severing combination to cut off the precise lengths of film fed.

The amount of paper being fed can be tailored precisely to the package size by adjusting the vertical position of disk 72 on rod 70 by manipulation of knob 78. This vertical adjustment of disk 72 controls the amount of rotation of bearing plate 66 needed to rotate bearing plate 68, and thus shaft 62, one revolution. This is due to the offsetting of shafts 56 and 62. And, since rotation of bearing plate 66 is coupled to the rotation paper feeding rollers through shaft 56 sprocket 86, chain 88 and sprocket 90, the amount of paper being fed is controllable by manipulation of knob 78 and can be precisely selected. The article grouper assembly 52 includes a shaft 100 mounted for pivotal movement in side frame members 102 and 104 of the apparatus. The shaft is positioned vertically well above the work area 22. A pair of arms, 106 and 108 respectively, are mounted on shaft 100 and extend downwardly toward the work area. A pusher bar 110 is mounted at the end of arms 106 and 108.

The shaft 100 is pivotable by an actuating assembly 112 that includes a double acting air cylinder 114 mounted to a bracket 116 adjacent the top frame member 118, which air cylinder includes a piston rod 120 depending therefrom, which is coupled to an operating lever 122. Operating lever 122 is coupled to shaft 100 and, upon actuation of the air cylinder, pivots shaft 100 either from an inactive position, whereat the pusher bar 110 is in the position shown phantom in FIG. 1 to its active position, shown in solid lines in FIG. 1, whereat the pusher bar is in position to urge articles in the work area against the front of a package formed by end sealer 38, or from its active position to its inactive position.

Compressed air is supplied to the two sides of air cylinder 114 through couplings 123 and 124 and air hoses 126 and 128 respectively, which latter are connected to a house supply (not shown).

Since the pusher bar passes in front of the sensing device 20 when it is being driven between its inactive and active positions, a microswitch 129 is provided to deactivate sensing device 20, while the pusher bar is being actuated.

Microswitch 129 includes an actuating member 129a and is mounted on frame member 102. A cam 130 is mounted on the end of shaft 100 in spaced relationship with actuating member 129a. Microswitch 129 is actuated by cam 130 as the actuating assembly drives the pusher bar into its active position, causing the sensing device to be locked out of the operating circuit of the apparatus until the actuating assembly returns the pusher bar to its inactive position.

In operation, the pusher bar is kept in its inactive position until actuation of microswitch 84, which shuts off the paper feed and actuates the end sealer 38 to form the front of the package. The microswitch 84 is also coupled to the air cylinder 114. Accordingly, as the front of the package is formed pusher bar 110 is driven to its active position whereat it pushes the articles in the work area against the front of the package just formed by the end sealer. After a short predetermined time period, the air cylinder 114 is actuated to withdraw the pusher bar to its inactive position.

The combination of the paper metering assembly 50 and the article grouper assembly 52 assures a tight package since the articles are pushed to the front of the package by the grouper assembly and the position of the rear of the package is determined by the paper metering assembly to be closely behind the back of the articles.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations and modifications as incorporate the spirit of the invention and depend upon its underlying concept are consequently to be considered as within the scope of the claims appended herebelow, unless the claims by their language expressly state otherwise.

I claim:

1. A method of packaging a group of articles such that the packaging material closely surrounds the group of articles being packaged to form a tight package thereabout, comprising the steps of:
    advancing a group of articles forwardly through a work station,
    setting in advance of the packaging operation a predetermined length of packaging material to be fed to the work station,
    metering said predetermined length of packaging material through the work station above and below the articles as they are being advanced therethrough by means independent of the force of the forward movement of the group of articles, whereby the articles are loosely enveloped by the packaging material,
    sealing the two sheets of packaging material to each other in the work station ahead of the group of articles to form a package front,
    engaging the rear of the group of articles in the work station to urge the group tightly against the said package front, and
    sealing the two sheets of packaging material to each other to form a package which is immediately adjacent the rear end of the said group of articles, the said predetermined length from the package front to the package rear thus being just sufficient to tightly embrace the said group of articles therebetween.

2. A method according to claim 1, comprising the further step of:
    sealing the two sheets of packaging material to each other adjacent opposite sides of the group of articles.

3. A method according to claim 1, wherein the step of urging the group of articles against the front of the package includes the step of moving a pusher bar against the rear of the group of articles.

4. A method according to claim 1, wherein the step of metering a predetermined amount of packaging material through the work station above and below the articles includes the steps of withdrawing sheets of packaging material from a reel.

5. A method according to claim 1, wherein the front package end is formed at the downstream end of the work station, and further comprising the steps of:
    advancing the group of articles through and out of the work station, and
    then performing the said steps of sealing the two sheets of material to each other to form the rear end of the package also at the said downstream end of the work station.

6. A method according to claim 5, comprising the further step of sealing the two sheets of packaging material to each other adjacent opposite sides of the group of articles.

* * * * *